United States Patent
Dong (10) Patent No.: US 12,520,212 B2
(45) Date of Patent: Jan. 6, 2026

(54) CELL RESELECTION METHOD, CELL RESELECTION APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 555 days.

(21) Appl. No.: 18/059,233

(22) Filed: Nov. 28, 2022

(65) Prior Publication Data

US 2023/0089127 A1 Mar. 23, 2023

Related U.S. Application Data (63) Continuation of application No. PCT/CN2020/093515, filed on May 29, 2020.

(51) Int. Cl.
*H04W 36/00* (2009.01)
*H04W 36/08* (2009.01)
*H04W 36/32* (2009.01)

(52) U.S. Cl.
CPC .......... *H04W 36/08* (2013.01); *H04W 36/326* (2023.05)

(58) Field of Classification Search
CPC ... H04W 36/08; H04W 36/326; H04W 48/20; H04W 84/06; H04W 4/023; H04W 36/30; H04W 36/322; H04W 48/04; H04W 36/0085; Y02D 30/70
USPC .......................................................... 455/440
See application file for complete search history.

(56) References Cited

U.S. PATENT DOCUMENTS

| | | | | |
|---|---|---|---|---|
| 7,877,098 | B2* | 1/2011 | Ryu | H04W 48/20 |
| | | | | 455/452.2 |
| 8,165,607 | B2* | 4/2012 | Lin | G01S 19/06 |
| | | | | 455/457 |
| 10,893,452 | B2* | 1/2021 | Lee | H04W 36/08 |
| 11,082,827 | B2* | 8/2021 | Yu | H04W 8/005 |
| 11,388,757 | B2* | 7/2022 | Qi | H04L 27/2607 |
| 11,528,644 | B2* | 12/2022 | Cheng | H04W 48/18 |
| 11,856,544 | B2* | 12/2023 | Singh | H04W 56/0045 |
| 11,997,593 | B2* | 5/2024 | Liberg | G01S 19/254 |
| 12,010,581 | B2* | 6/2024 | Lee | H04W 36/302 |
| 12,022,342 | B2* | 6/2024 | Liberg | G01S 5/14 |
| 12,035,189 | B2* | 7/2024 | Määttänen | H04W 36/00837 |

(Continued)

FOREIGN PATENT DOCUMENTS

| | | |
|---|---|---|
| CN | 1791261 A | 6/2006 |
| CN | 101931985 A | 12/2010 |

(Continued)

OTHER PUBLICATIONS

Office Action for Russian Application No. 2022131131/07, dated Apr. 24, 2023, 16 pages.

(Continued)

*Primary Examiner* — Amancio Gonzalez
(74) *Attorney, Agent, or Firm* — Finnegan, Henderson, Farabow, Garrett & Dunner, L.L.P.

(57) ABSTRACT

A method for cell reselection is performed by a terminal, and includes: obtaining a reference distance threshold of a cell and determining an actual distance between the terminal and a center of the cell; and performing cell reselection based on the reference distance threshold and the actual distance.

14 Claims, 6 Drawing Sheets

(56) References Cited

U.S. PATENT DOCUMENTS

| | | | |
|---|---|---|---|
| 12,127,054 B2* | 10/2024 | Kim | H04W 36/0079 |
| 2008/0200187 A1 | 8/2008 | Lin et al. | |
| 2012/0177010 A1* | 7/2012 | Huang | H04W 4/021 |
| | | | 370/335 |
| 2017/0195833 A1* | 7/2017 | Chami | H04W 4/029 |
| 2017/0195835 A1* | 7/2017 | Chami | H04L 43/12 |
| 2022/0330339 A1* | 10/2022 | Siomina | H04W 74/0816 |
| 2024/0251316 A1* | 7/2024 | Won | H04W 36/0072 |

FOREIGN PATENT DOCUMENTS

| | | |
|---|---|---|
| CN | 104219718 A | 12/2014 |
| CN | 105228200 A | 1/2016 |
| CN | 105407502 A | 3/2016 |
| CN | 107196728 B | 7/2019 |
| CN | 110012497 A | 7/2019 |
| CN | 110572765 A | 12/2019 |
| CN | 110972190 A | 4/2020 |
| RU | 2491774 C2 | 8/2013 |
| WO | WO 2021219283 A1 | 11/2021 |

OTHER PUBLICATIONS

Notice of the first review opinion for Chinese Application No. 202080001166.9, dated Apr. 21, 2023, 10 pages.

Office Action for Japanese Application No. 2022-573157, dated Aug. 14, 2023, 10 pages.

Ericsson, "Location reporting for Ntn," 3GPP TSG-RAN WG2 #107, Tdoc R2-1911272, Prague, Czech Republic, Aug. 26-30, 2019, 9 pages.

NEC, "Location based mobility enhancement," 3GPP TSG-RAN WG2 #108, R2-1914973, Reno, USA, Nov. 18-22, 2019, 6 pages.

Office Action issued by the Korean Patent Office on Mar. 25, 2025, in corresponding Application No. KR 10-2022-7043831, 11 pages.

Office Action issued by the Ministry of Justice of the republic of Indonesia on Apr. 14, 2025, in corresponding Application No. ID P00202213929, 6 pages.

"Cell selection/reselection for NTN GEO and LEO" Ericsson, 3GPP TSG-RAN WG2 #107, Tdoc R2-1910543, Prague, Czech Republic, Aug. 26-30, 2019, 5 pages.

"Report on email discussion [106#74][NTN] Cell Selection & reselection" LG Electronics Inc., 3GPP TSG-RAN WG2 Meeting #107, R2-1911297, Prague, Czech Republic, Aug. 26-30, 2019, 16 pages.

"Report of Email Discussion [106#72] [NR/NTN] TP on NTN-TN Service continuity", Nokia (Email discussion rapporteur), 3GPP TSG-RAN WG2 Meeting #107, R2-1910692, Prague, CZ, Aug. 26-30, 2019, 16 pages.

Examination report for India Application No. 202247069143, issued on Jan. 25, 2023, 7 pages.

International Search Report of International Application No. PCT/CN2020/093515, mailed Feb. 10, 2021, 8 pages.

Office Action issued by the Intellectual Property India on Jun. 30, 2025, in corresponding Application No. IN 202247069143, 3 pages.

* cited by examiner

CELL RESELECTION METHOD, CELL RESELECTION APPARATUS, AND STORAGE MEDIUM

CROSS-REFERENCE TO RELATED APPLICATION

This application is a continuation of International Application No. PCT/CN2020/093515, filed on May 29, 2020, the content of which is hereby incorporated by reference.

TECHNICAL FIELD

The disclosure relates to the field of communication technologies, and in particular to, a method and a device for cell reselection, and a storage medium.

BACKGROUND

In the related art, a terminal reselects a cell for a terrestrial network based on S-criteria and R-criteria.

With the development of fifth generation (5G) networks, a non-terrestrial network (NTN) has been introduced. For the NTN network, a cell radius is larger and a difference of reference signal received powers (RSRPs) or reference signal received qualities (RSRQ) when the terminal is at a center or edge of the cell is small; and since the cell radius is larger, an overlapping area of cells is relatively large.

SUMMARY

According to a first aspect of embodiments of the disclosure, a method for cell reselection is provided, which includes: obtaining a reference distance threshold of a cell and determining an actual distance between a terminal and a center of the cell; and performing cell reselection based on the reference distance threshold and the actual distance.

According to a second aspect of embodiments of the disclosure, a method for cell reselection is provided, which includes: sending a reference distance threshold of a cell, in which the reference distance threshold is configured for a terminal to perform cell reselection based on the reference distance threshold and an actual distance between the terminal and a center of the cell.

According to a third aspect of embodiments of the disclosure, a device for cell reselection is provided, which includes: a processor; and a memory for storing instructions executable by the processor, in which the processor is configured to perform the method as described in the first aspect.

According to a fourth aspect of embodiments of the disclosure, a device for cell reselection is provided, which includes: a processor; and a memory for storing instructions executable by the processor, in which the processor is configured to perform the method as described in the second aspect.

According to a fifth aspect of embodiments of the disclosure, a non-transitory computer-readable storage medium is provided. When instructions in the storage medium are executed by a processor of a mobile terminal, the mobile terminal performs the method as described in the first aspect.

According to a sixth aspect of embodiments of the disclosure, a non-transitory computer-readable storage medium is provided. When instructions in the storage medium are executed by a processor of a network device, the network device performs the method as described in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
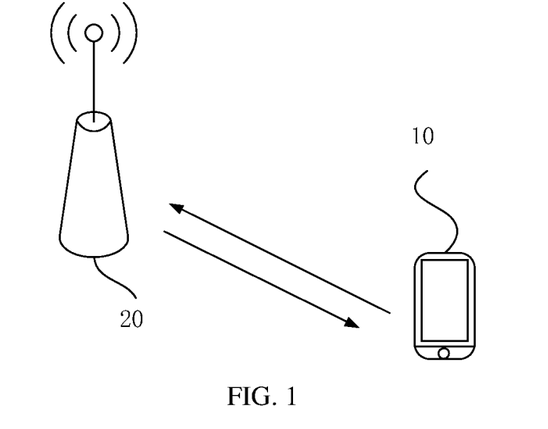
FIG. 1 is a diagram illustrating an architecture of a communication system, according to some embodiments.

The information sending method provided in embodiments of the disclosure can be applicable to a wireless communication system in FIG. 1. Referring to FIG. 1, the wireless communication system includes a terminal 10 and a network device 20. Information is sent and received between the terminal 10 and the network device 20 through wireless resources.

It can be understood that the wireless communication system in FIG. 1 is only for schematic illustration. The wireless communication system may also include other network devices, such as a core network device, a wireless relay device, and a wireless backhaul device, which are not illustrated in FIG. 1. Embodiments of the disclosure do not limit the number of network devices and the number of terminals included in the wireless communication system.

It can be further understood that the wireless communication system in embodiments of the disclosure is a network that provides wireless communication functions. The wireless communication system can use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), or carrier sense multiple access with collision avoidance. According to different network capacities, speeds, delays and other factors, the network can be divided into a second generation (2G) network, a third generation (3G) network, a fourth generation (4G) network, or a future evolution network such as a 5G network. The 5G network can also be called a new radio (NR) network. For the convenience of description, the wireless communication network is sometimes referred to as a network for short in this disclosure.

Further, the network device involved in the disclosure may also be referred to as a wireless access network device. The wireless access network device may be a base station, an evolved base station (evolved node B), a home base station, an access point (AP) in a wireless fidelity (WIFI) system, a wireless relay node, a wireless backhaul node, a transmission point (TP), a transmission and reception point (TRP), a gNB in an NR system, or a component or part of a device constituting the base station. When it is a vehicle-to-vehicle (V2X) communication system, the network device may also be a vehicle-mounted device. In embodiments of the disclosure, the specific technology and specific device form adopted by the network device are not limited.

Further, the terminal involved in the disclosure may also be referred to as a terminal device, a user equipment (UE), a mobile station (MS), a mobile terminal (MT), or the like, which is a device that provides voice and/or data connectivity for a user. For example, the terminal may be a handheld device, a vehicle-mounted device, or the like, with a wireless connection function. At present, some examples of terminals are smart phones, pocket personal computers (PPCs), handheld computers, personal digital assistants (PDAs), notebook computers, tablet computers, wearable devices, vehicle-mounted devices, or the like. In addition, when it is a vehicle-to-vehicle (V2X) communication system, the terminal device may also be a vehicle-mounted device. Embodiments of the disclosure do not limit the specific technology and specific device form adopted by the terminal.

Cell selection or reselection is performed during the communication between the terminal and the network device. Embodiments of the disclosure are applicable to the process of cell selection or reselection. In the related art, S-criteria and R-criteria are involved for cell selection or reselection.

S-criteria refers to Srxlev>0 and Squal>0, where, Srxlev is a cell selection receive (Rx) level value and Squal is a cell selection quality value. The cell selected or reselected by the terminal needs to satisfy S-criteria.

Further, for intra-frequency measurements of the terminal, if the serving cell satisfies Srxlev>SIntraSearchP and Squal>SIntraSearchQ, the terminal may select not to perform measurements on intra-frequency neighboring cells. SIntraSearchP is a reference signal received power (RSRP) threshold for intra-frequency measurements (also known as a cell selection receive level threshold for intra-frequency measurements) and SIntraSearchQ is a reference signal received quality (RSRQ) threshold for intra-frequency measurements (also known as a cell selection quality threshold for intra-frequency measurements).

R-criteria refers to: Rs=Qmeas,s+Qhyst−Qoffsettemp, Rn=Qmeas,n−Qoffset−Qoffsettemp, where, Rs is a R value of a serving cell, Rn is a R value of a neighboring cell, Qmeas,s is a RSRP measurement value of the serving cell, Qmeas,n is a RSRP measurement value of the neighboring cell, Qhyst is a cell reselection hysteresis value, and Qoffsettemp is a temporary offset value, and Qoffset is an offset value. The agreement of Qmeas, Qoffset, and Qoffsettemp are shown in Table 1 below.

TABLE 1

| | |
|---|---|
| Qmeas | RSRP measurement quantity used in cell reselections. |
| Qoffset | For intra-frequency: Equals to $Qoffset_{s,\,n}$, if $Qoffset_{s,\,n}$ is valid, otherwise this equals to zero. |
| | For inter-frequency: Equals to $Qoffset_{s,\,n}$ plus $Qoffset_{frequency}$, if $Qoffset_{s,\,n}$ is valid, otherwise this equals to $Qoffset_{frequency}$. |
| Qoffsettemp | Offset temporarily applicable to a cell as specified in TS 38.331 [3]. |

The above-mentioned manner for cell reselection based on S-criteria and R-criteria is applicable to a terrestrial network. With the development of communication technologies, an NTN network is introduced. A network characteristic of the NTN network is a larger cell radius. For the NTN network with the larger cell radius, a difference in RSRPs or RSRQs when the terminal is at a center or edge of the cell is small, and since the larger cell radius, an overlapping area of cells is relatively large. Therefore, when the terminal moves and causes channel fading (such as occlusion), cell reselection based on S-criteria and R-criteria may cause the terminal to perform the cell reselection in two cells back and forth, and if the cell reselection is performed based on S-criteria and R-criteria, it is difficult to configure reasonable cell reselection parameters.

Therefore, for the NTN network, due to its network characteristic, the manner for cell reselection based on S-criteria and R-criteria may not well solve problems encountered by the terminal during cell selection/reselection in the NTN network.

In view of this, embodiments of the disclosure provide a method for cell reselection. A network device provides a terminal with reference location information of a cell, and the reference location information is configured to determine a reference distance threshold of the cell. The reference distance threshold indicates a distance at which the cell can provide good network services. When an actual distance between the terminal and a center of the cell is less than the reference distance threshold, the cell can provide good network services to the terminal. The good network services provided by the cell can be understood as a signal quality of the cell is higher than a specified signal quality threshold. The reference distance threshold provided by the network is usually smaller than the actual coverage distance of the cell, where the actual coverage distance of the cell is characterized by the cell radius. When the terminal performs cell reselection, it performs the cell reselection based on the reference distance threshold of the cell and the actual distance between the terminal and the center of the cell. It can combine distance conditions between the terminal and the cell to perform the cell reselection and applicable to the cell reselection of the NTN network with the larger cell radius.

Figure 2:
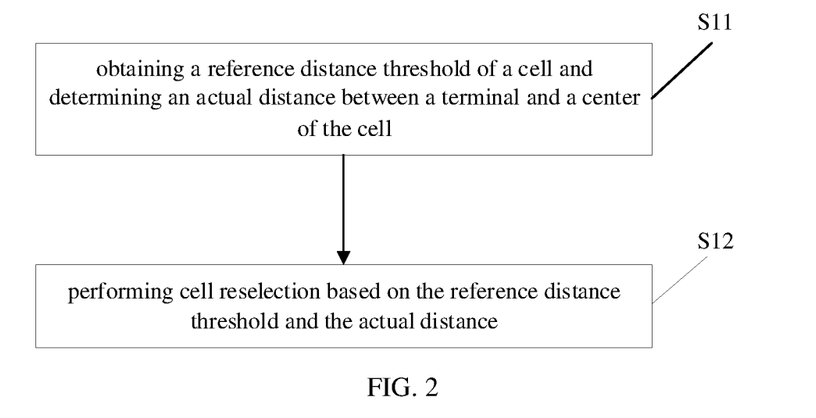
FIG. 2 is a flow chart illustrating a method for cell reselection, according to some embodiments.

FIG. 2 is a flow chart illustrating a method for cell reselection, according to some embodiments. As illustrated in FIG. 2, the following steps are included. The method for cell reselection in FIG. 2 can be applicable to the terminal. Of course, it can also be applicable to other devices that can execute the following related methods.

In step S11, a reference distance threshold of a cell is obtained and an actual distance between a terminal and a center of the cell is determined.

In some embodiments of the disclosure, the cell corresponding to the reference distance threshold and the actual distance may be a serving cell of the terminal or a neighboring cell of the terminal, which may also be understood as a candidate cell in the candidate list for cell reselection.

The reference distance threshold can be determined based on cell reference location information provided by the NTN network to the terminal. The reference location information of the cell can be defined by the network device through a system broadcast message. In some embodiments of the disclosure, the reference location information of the cell is configured to determine the reference distance threshold of the cell. The reference location information of the cell and the reference distance threshold of the cell are sometimes used interchangeably, but those skilled in the art should understand its meaning.

In step S12, cell reselection is performed based on the reference distance threshold and the actual distance.

In some embodiments of the disclosure, the terminal performs the cell reselection based on the reference distance threshold of the cell and the actual distance between the terminal and the center of the cell, to combine distance conditions between the terminal and the cell to perform the cell reselection, which is suitable for the cell reselection of the NTN network with the larger cell radius.

Figure 3:
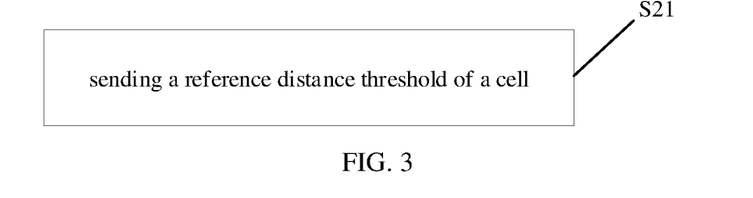
FIG. 3 is a flow chart illustrating a method for cell reselection, according to some embodiments.

FIG. 3 is a flow chart illustrating a method for cell reselection, according to some embodiments. As illustrated in FIG. 3, the method includes the following steps. The method for cell reselection in FIG. 3 can be applicable to a network device. Of course, it can also be applicable to other devices that can execute the following related methods.

In step S21, a reference distance threshold of a cell is sent, in which the reference distance threshold is configured for a terminal to perform cell reselection based on the reference distance threshold and an actual distance between the terminal and a center of the cell.

In an example, the network device provides the reference distance threshold of the cell through a system broadcast message. The terminal obtains the reference distance threshold of the cell based on the system broadcast message of the serving cell and/or neighboring cell.

In another example, the actual distance between the terminal and the center of the cell may be determined by the terminal based on the actual location of the terminal and the actual location information of the cell, or may be determined by the network device based on the actual location of the terminal and the actual location information of the cell.

When the terminal decides based on the actual location of the terminal and the actual location information of the cell, the location information of the terminal is determined, and cell reference location information provided by the network device is obtained. The cell reference location information provided by the network device can be determined through the ephemeris information (the network location information of the cell) included in the system broadcast message. The network device sends the cell reference location information to the terminal. The terminal obtains the cell reference location information, and determines the actual distance between the terminal and the center of the cell based on the location information of the terminal and the cell reference location information.

When the network device decides based on the actual location of the terminal and the actual location information of the cell, the terminal determines the location information of the terminal and sends the location information of the terminal to the network device. The location information of the terminal sent by the terminal to the network device may be reported based on the measurement of the terminal, such as the measurement value related to the location reported by the terminal. The network device obtains the location information of the terminal, and determines the actual distance between the terminal and the center of the cell based on the location information of the terminal and the cell location information (the ephemeris information). When the network device obtains the location information of the terminal, the location information of the terminal can be determined based on the measurement report of the terminal. For example, the network device calculates the location information of the terminal based on the location-related measurement value reported by the terminal. After determining the actual distance between the terminal and the center of the cell, the network device sends the determined actual distance between the terminal and the center of the cell to the terminal. The terminal obtains, the actual distance between the terminal and the center of the cell determined by the network device based on the location information of the terminal and the cell location information, to determine the actual distance between the terminal and the center of the cell.

In some embodiments of the disclosure, the method for cell reselection will be described below in combination with practical applications.

For the convenience of description in some the embodiments of the disclosure, Dref is used to represent the reference distance threshold of the cell and Dmeasure is used to represent the actual distance between the terminal and the center of the cell.

In some embodiment of the disclosure, when the cell reselection is performed based on two parameters Dref and Dmeasure, the measurement condition under which the terminal does not start measurements on intra-frequency neighboring cells can be determined based on Dref and Dmeasure. In an example, after determining Dref of the serving cell and Dmeasure of the terminal and the center of the serving cell, the terminal may select not to measure intra-frequency neighboring cells when Srxlev>SIntraSearchP, Squal>SIntraSearchQ, and Dref>Dmeasure. That is, in response to the service cell of the terminal satisfying Srxlev>SIntraSearchP, Squal>SIntraSearchQ, and Dref>Dmeasure, the terminal may select not to measure intra-frequency neighboring cells.

In some embodiments of the disclosure, when the cell reselection is performed based on two parameters Dref and Dmeasure, conditions that the cell obtained by performing the cell reselection needs to satisfy, can be determined based on Dref and Dmeasure. In an example, the cell obtained by performing the cell reselection based on Dref and Dmeasure satisfies: Dref>Dmeasure. Further, in some embodiment of the disclosure, the cell obtained by performing the cell reselection needs to satisfy S-criteria. That is, the cell obtained by performing the cell reselection based on Dref and Dmeasure needs to satisfy Srxlev>0, Squal>0, and Dref>Dmeasure.

In some embodiments of the disclosure, the cell for cell reselection based on Dref and Dmeasure can be understood as the candidate cell in the candidate list for cell reselection based on S-criteria. The candidate cell may include the serving cell of the terminal or the neighboring cell of the terminal. The target cell obtained by performing the cell reselection based on Dref and Dmeasure can be understood as one of cells that satisfy S-criteria.

It can be further understood that, in some embodiments of the disclosure, the criterion involved in the cell reselection that satisfies Srxlev>0, Squal>0, and Dref>Dmeasure may be a newly defined S-criteria. The newly defined S-criteria can be: Srxlev>0, Squal>0, and D>0, where D=Dref-Dmeasure. Dmeasure is the distance between the terminal and the center of the target cell, Dref is the reference distance threshold of the target cell, Srxlex is the cell selection receive level value of the target cell, and Squal is the cell selection quality value of the target cell. It is to be understood that the cell obtained by performing the cell reselection based on Dref and Dmeasure in some embodiments of the disclosure needs to satisfy the above-mentioned newly defined S-criteria.

It can be further understood that the cell obtained by performing the cell reselection based on Dref and Dmeasure in some embodiments of the disclosure may be the serving cell before the terminal performs the cell reselection, or may be the neighboring cell of the terminal.

In an implementation manner, in some embodiments of the disclosure, after the cell reselection is performed based on the existing S-criteria and R-criteria, Dref and Dmeasure are combined to perform the cell reselection.

Figure 4:
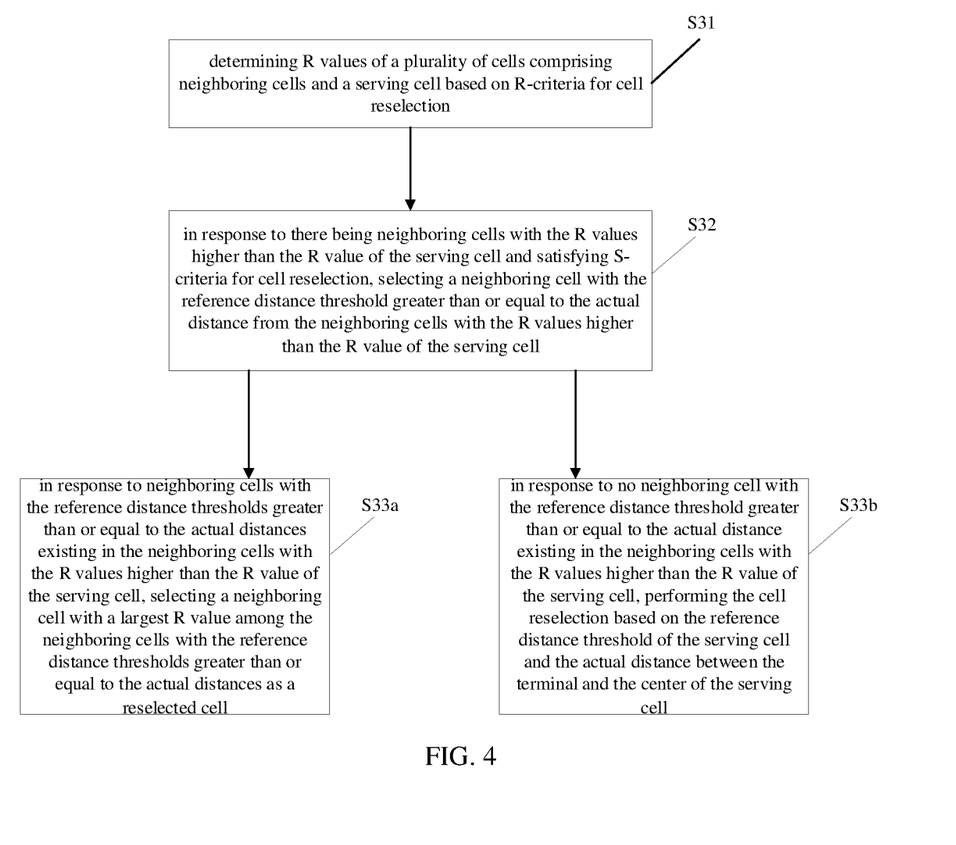
FIG. 4 is a flow chart illustrating a method for cell reselection based on a reference distance threshold of a cell and an actual distance between a terminal and a center of the cell, according to some embodiments.

FIG. 4 is a flow chart illustrating a method for cell reselection based on a reference distance threshold of a cell and an actual distance between a terminal and a center of the cell, according to some embodiments. Refer to FIG. 4, the following steps are included.

In step S31, the terminal determines R values of a plurality of cells including neighboring cells and a serving cell based on R-criteria for cell reselection.

In step S32, in response to there being neighboring cells with the R values higher than the R value of the serving cell and satisfying S-criteria for cell reselection, a neighboring cell where Dref≥Dmeasure is selected from the neighboring cells with the R values higher than the R value of the serving cell.

There are neighboring cells with the R values higher than the R value of the serving cell, that is, the determined neighboring cell R value is higher than the serving cell R value, and these neighboring cells satisfy S-criteria for cell reselection, the terminal needs to combine Dref and Dmeasure to determine whether to reselect to the neighboring cell. For example, the terminal selects a neighboring cell where Dref≥Dmeasure from neighboring cells with the R values higher than the R value of the serving cell.

When the terminal selects a neighbor cell where Dref≥Dmeasure from neighbor cells with the R values higher than the R value of the serving cell, it can determine whether to select a neighbor cell as the reselected cell based on whether there is a neighbor cell where Dref≥Dmeasure among the neighbor cells with the R values higher than the R value of the serving cell.

In step S33a, in response to neighboring cells where Dref≥Dmeasure existing in the neighboring cells with the R values higher than the R value of the serving cell, a neighboring cell with a largest R value is selected among the neighboring cells where Dref≥Dmeasure as the reselected cell.

In step S33b, in response to no neighboring cell where Dref≥Dmeasure existing in the neighboring cells with the R values higher than the R value of the serving cell, the cell reselection is performed based on the reference distance threshold of the serving cell and the actual distance between the terminal and the center of the serving cell.

In an example, when the cell reselection is performed based on Dref and Dmeasure of the serving cell, in response to Dref≥Dmeasure of the serving cell, it resides in the serving cell. In response to Dref<Dmeasure of the serving cell, the neighboring cell with the largest R value is selected as the reselected cell among the neighboring cells with the R values higher than the R value of the serving cell.

In some embodiments, the terminal sorts the R values of the plurality of cells based on R-criteria. If the R values of N neighboring cells are higher than the R value of the serving cell, P cells satisfying Dref≥Dmeasure are selected from the N neighboring cells. Then the cell with the largest R value is selected from the P cells. If P>0, the terminal reselects to the selected cell with the largest R value. If P=0 (that is, no neighboring cell satisfies Dref≥Dmeasure at this time), and if the serving cell satisfies Dref≥Dmeasure, the terminal still resides in the serving cell and does not perform the cell reselection. If the serving cell does not satisfy Dref≥Dmeasure (Dref<Dmeasure), the terminal reselects to the cell with the largest R value among the N cells.

In some embodiments of the disclosure, the above method for cell reselection can be used to reselect to the neighboring cell when the R value of the neighboring cell is greater than the R value of the serving cell and the neighboring cell's reference distance threshold is greater than or equal to the actual distance. Further, in response to there is no neighboring cell that satisfies the distance requirement between Dref and Dmeasure, if the serving cell satisfies the distance requirement, it resides in the serving cell. In response to the lack of neighboring cells that satisfy the distance requirements between Dref and Dmeasure, and the serving cell does not satisfy the distance requirements, it resides in the neighboring cell with the higher R value.

In another implementation manner, the terminal may perform the cell reselection according to the newly defined S-criteria.

Figure 5:
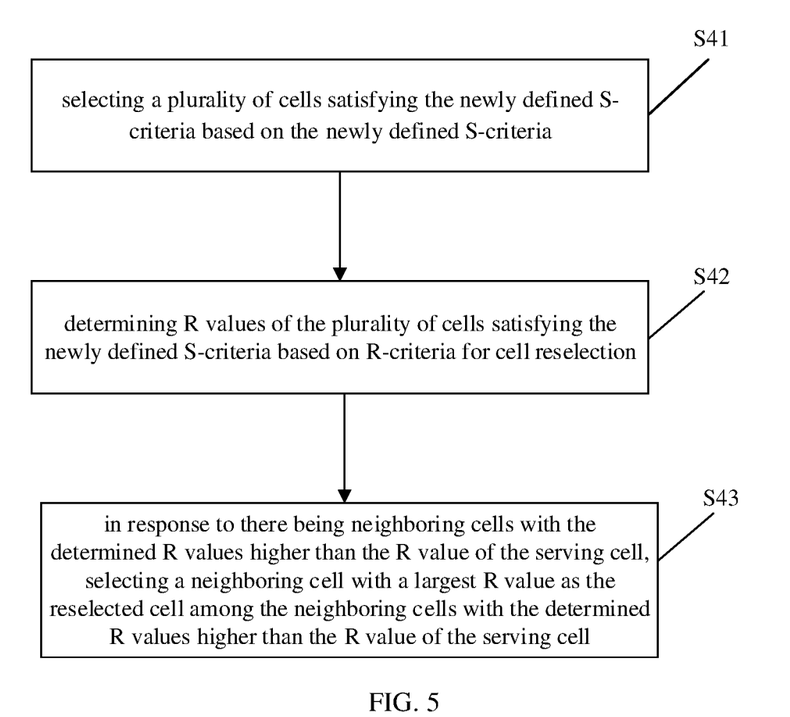
FIG. 5 is a flow chart illustrating a method for cell reselection based on a reference distance threshold of a cell and an actual distance between a terminal and a center of the cell, according to some embodiments.

FIG. 5 is a flow chart illustrating a method for cell reselection based on a reference distance threshold of a cell and an actual distance between a terminal and a center of the cell, according to some embodiments. Refer to FIG. 5, the following steps are included.

In step S41, the terminal selects a plurality of cells satisfying the newly defined S-criteria based on the newly defined S-criteria (Srxlev>0 and Squal>0 and D>0).

In step S42, R values of the plurality of cells satisfying the newly defined S-criteria are determined based on R-criteria for cell reselection.

In step S43, in response to there being neighboring cells with the determined R values higher than the R value of the serving cell, a neighboring cell with a largest R value is selected as the reselected cell among the neighboring cells with the determined R values higher than the R value of the serving cell.

In some embodiment of the disclosure, when the terminal performs the cell reselection based on Dref and Dmeasure, Dref and Dmeasure are applicable to neighbor cell measurements, S-criteria and R-criteria. It may be applicable to the NTN network cell reselection with the larger cell radius. Selecting the cell that satisfies Dref>Dmeasure can prevent the terminal from performing the cell reselection in two cells back and forth.

The method for cell reselection provided in some embodiments of the disclosure is also applicable to the process of interaction between the terminal and the network device. In an example, the network device defines Dref through a system broadcast message. The terminal obtains Dref of each cell from the system broadcast messages of the serving cell and/or the neighboring cell, and obtains the ephemeris information (cell location information) from the system broadcast messages. The terminal determines its location, such as determines its own location based on GPS, and determines Dmeasure between it and the center of the cell in combination with the ephemeris information obtained from the network device. When the terminal performs the cell selection or reselection, it selects the plurality of cells that satisfy the newly defined S-criteria involved in the above solutions, and applies R-criteria to the selected cells. The terminal reselects to the cell with the largest R value. If the cell with the largest R value is the current serving cell, the terminal does not perform the cell reselection, and it still resides in the current cell. Or, when the terminal performs the cell selection or reselection, it selects the plurality of cells that satisfy the existing S-criteria, applies R-criteria to the selected cells, and then combines Dref and Dmeasure to perform the cell reselection.

In some embodiments of the disclosure, for the interaction process between the terminal and the network device to implement paging in an unlicensed frequency band or in a licensed frequency band, reference may be made to the relevant description of the foregoing embodiments, and details are not described herein again.

Based on the same concept, some embodiments of the disclosure also provide an apparatus for cell reselection.

It can be understood that, to implement the above-mentioned functions, the apparatus for cell reselection provided in some embodiments of the disclosure includes hardware structures and/or software modules for implements various functions. In combination with units and algorithm steps of examples disclosed in embodiments of the disclosure, embodiments of the disclosure can be implemented in the form of hardware or a combination of hardware and computer software. Whether a certain function is executed by hardware or computer software-driven hardware depends on the specific application and design constraint conditions of technical solutions. Those skilled in the art can use different manners for each specific application to implement the described functions, and such implementation should not be considered as going beyond the scope of technical solutions of embodiments of the disclosure.

Figure 6:
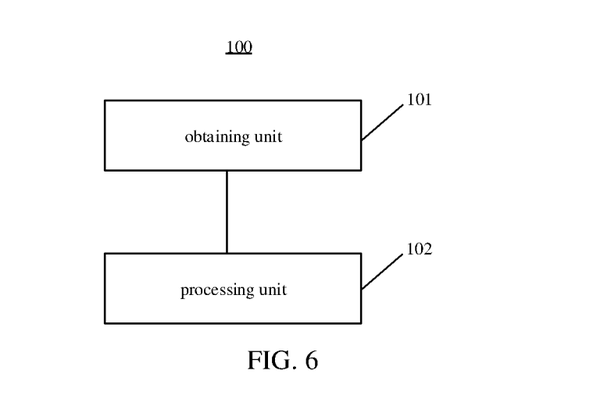
FIG. 6 is a block diagram illustrating an apparatus for cell reselection, according to some embodiments.

FIG. 6 is a block diagram illustrating an apparatus for cell reselection, according to some embodiments. Referring to FIG. 6, the apparatus 100 for cell reselection includes an obtaining unit 101 and a processing unit 102. The obtaining unit 101 is configured to obtain a reference distance threshold of a cell and determine an actual distance between a terminal and a center of the cell. The processing unit 102 is configured to perform cell reselection based on the reference distance threshold and the actual distance.

In an implementation manner, the cell includes a serving cell of the terminal and the processing unit 102 is further configured to: in response to a cell selection receive level value being greater than a cell selection receive level threshold for intra-frequency measurements, a cell selection quality value being greater than a cell selection quality threshold for intra-frequency measurements, and the reference distance threshold of the serving cell being greater than the actual distance between the terminal and the center of the serving cell, not measure intra-frequency neighboring cells. This is presented as Srxlev>SIntraSearchP and Squal>SIntraSearchQ, where Srxlev is the cell selection receive level value, SIntraSearchP is the cell selection receive level threshold for intra-frequency measurements, Squal is the cell selection quality value, and SIntraSearchQ is the cell selection quality threshold for intra-frequency measurements.

In another implementation manner, a target cell obtained by performing the cell reselection based on the reference distance threshold and the actual distance satisfies: a cell selection receive level value of the target cell being greater than 0, a cell selection quality value of the target cell being greater than 0, and the reference distance threshold of the target cell being greater than the actual distance between the terminal and the center of the target cell.

In another implementation manner, the processing unit 102 is configured to perform the cell reselection based on the reference distance threshold and the actual distance by: determining R values of a plurality of cells based on R-criteria for cell reselection, in which the plurality of cells include neighboring cells and a serving cell; in response to there being neighboring cells with the R values higher than the R value of the serving cell and satisfying S-criteria for cell reselection, selecting a neighboring cell with the reference distance threshold greater than or equal to the actual distance from the neighboring cells with the R values higher than the R value of the serving cell; in response to neighboring cells with the reference distance thresholds greater than or equal to the actual distances existing in the neighboring cells with the R values higher than the R value of the serving cell, selecting a neighboring cell with a largest R value among the neighboring cells with the reference distance thresholds greater than or equal to the actual distances as a reselected cell; and in response to no neighboring cell with the reference distance threshold greater than or equal to the actual distance existing in the neighboring cells with the R values higher than the R value of the serving cell, performing the cell reselection based on the reference distance threshold of the serving cell and the actual distance between the terminal and the center of the serving cell.

In another implementation manner, the processing unit 102 is configured to perform the cell reselection based on the reference distance threshold of the serving cell and the actual distance between the terminal and the center of the serving cell by: in response to the reference distance threshold of the serving cell being greater than or equal to the actual distance between the terminal and the center of the serving cell, residing in the serving cell; and in response to the reference distance threshold of the serving cell being less than the actual distance between the terminal and the center of the serving cell, selecting a neighboring cell with a largest R value among the neighboring cells with the R values higher than the R value of the serving cell as the reselected cell.

In another implementation manner, the processing unit 102 is configured to perform the cell reselection based on the reference distance threshold and the actual distance by: selecting cells that satisfy conditions of cell selection receive level values being greater than 0, cell selection quality values being greater than 0, and reference distance thresholds being greater than actual distances; determining R values of a plurality of cells in the selected cells based on R-criteria for cell reselection; and in response to there being neighboring cells with the determined R values higher than the R value of the serving cell, selecting a neighboring cell with a largest R value among the neighboring cells with the determined R values higher than the R value of the serving cell as a reselected cell.

In another implementation manner, the obtaining unit 101 is configured to determine the actual distance between the terminal and the center of the cell by: determining location information of the terminal and obtaining cell location information provided by a network device; and determining the actual distance between the terminal and the center of the cell based on the location information of the terminal and the cell location information.

In another implementation manner, the obtaining unit 101 is configured to determine the actual distance between the terminal and the center of the cell by: determining location information of the terminal and sending the location information to a network device; and obtaining the actual distance between the terminal and the center of the cell, determined by the network device based on the location information of the terminal and cell location information.

In another implementation manner, the obtaining unit 101 is configured to obtain the reference distance threshold of the cell by: obtaining the reference distance threshold of the cell based on a system broadcast message of a serving cell and/or a neighboring cell.

Figure 7:
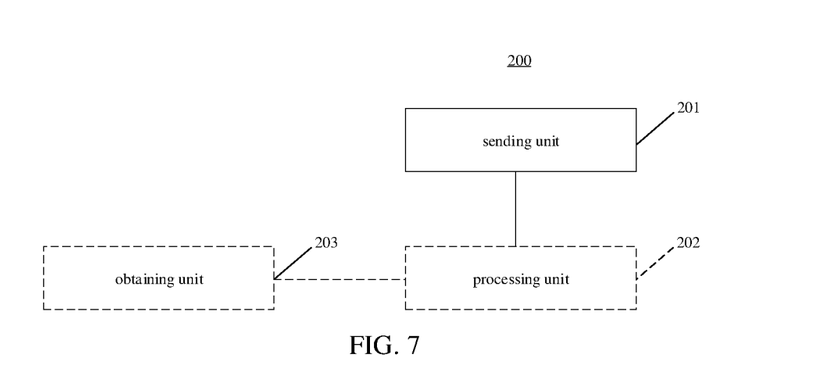
FIG. 7 is a block diagram illustrating an apparatus for cell reselection, according to some embodiments.

FIG. 7 is a block diagram illustrating an apparatus for cell reselection, according to some embodiments. Referring to FIG. 7, the apparatus 200 for cell reselection includes a sending unit 201.

The sending unit 201 is configured to send a reference distance threshold of a cell, in which the reference distance threshold is configured for a terminal to perform cell reselection based on the reference distance threshold and an actual distance between the terminal and a center of the cell.

In an implementation manner, the sending unit 201 is further configured to: send cell location information, in which the cell location information is configured for the terminal to determine the actual distance.

In another implementation manner, the apparatus 200 further includes: an obtaining unit 203, configured to obtain location information of the terminal; and a processing unit 202, configured to determine the actual distance between the terminal and the center of the cell based on the location information of the terminal and cell location information, in which the sending unit is further configured to send the actual distance to the terminal.

In another implementation manner, a target cell obtained by performing the cell reselection by the terminal based on the reference distance threshold and the actual distance satisfies: a cell selection receive level value of the target cell being greater than 0, a cell selection quality value of the target cell being greater than 0, and the reference distance threshold of the target cell being greater than the actual distance between the terminal and the center of the target cell.

With respect to the apparatuses in the above embodiments, the specific manners for performing operations for individual modules therein have been described in detail in the embodiments regarding the methods, which will not be elaborated herein.

Figure 8:
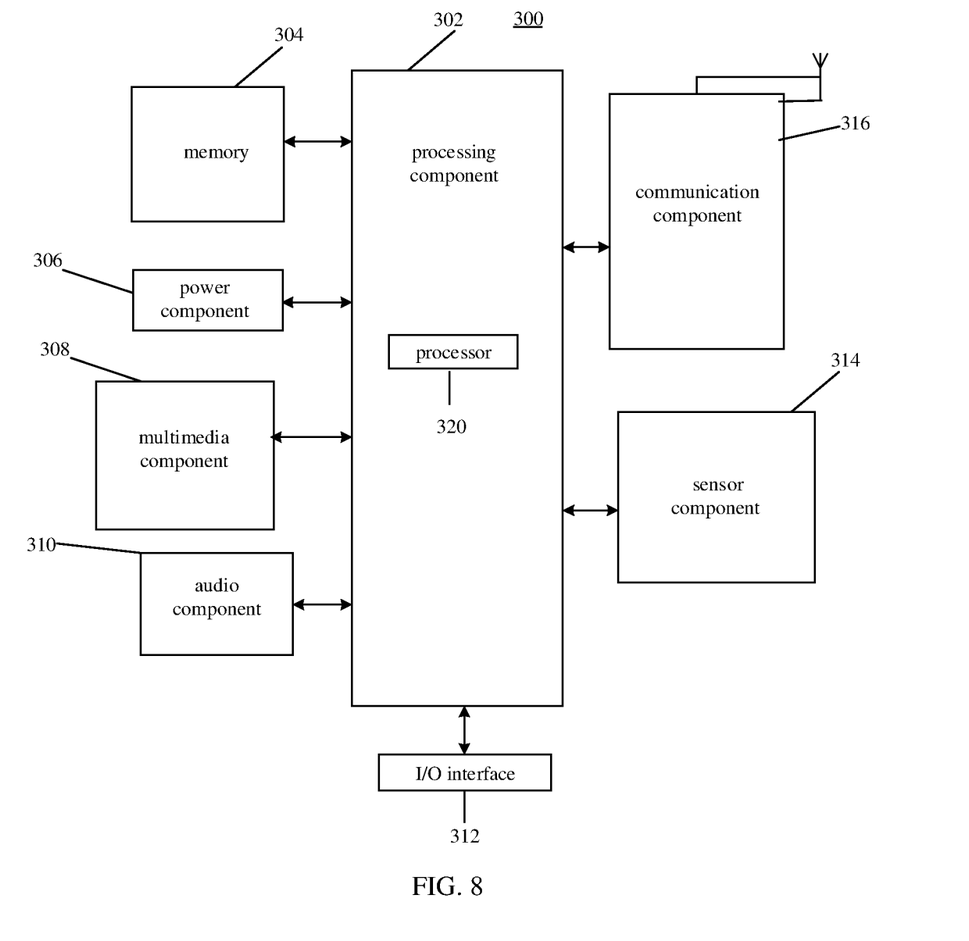
FIG. 8 is a block diagram illustrating a device for cell reselection, according to some embodiments.

FIG. 8 is a block diagram illustrating a device 300 for cell reselection, according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 8, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one embodiment, the communication component 316 receives a broadcast signal or broadcast associated information from an external broadcast management system via a broadcast channel In one embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 9:
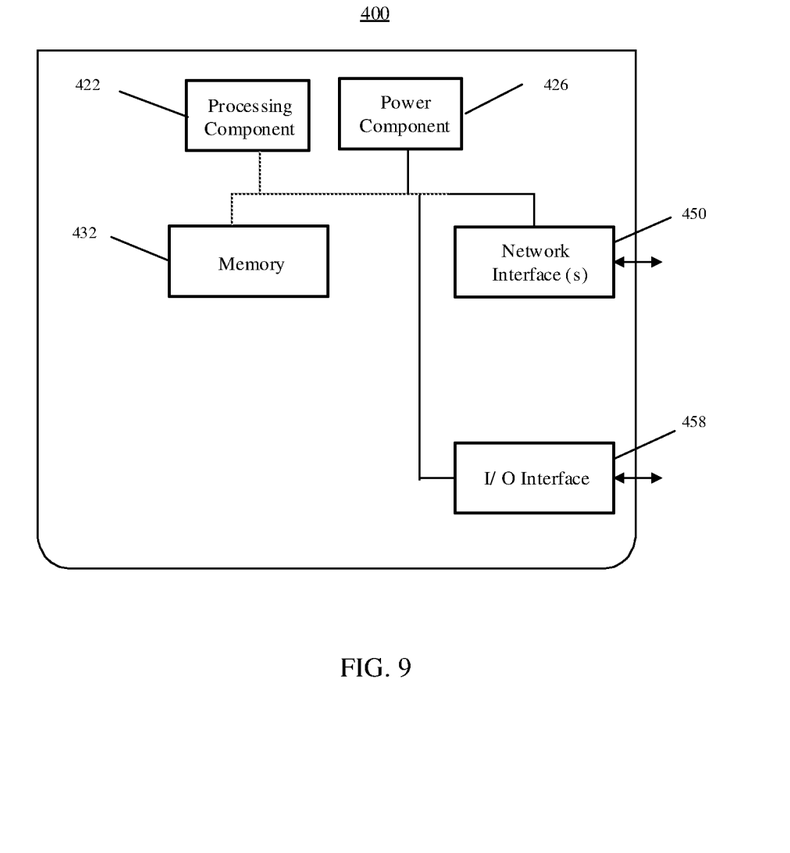
FIG. 9 is a block diagram illustrating a device for cell reselection, according to some embodiments.

FIG. 9 is a block diagram illustrating a device 400 for cell reselection, according to some embodiments. For example, the device 400 may be provided as a network device, such as a base station or the like. Referring to FIG. 9, the device 400 includes a processing component 422 which further includes one or more processors, and a memory resource represented by a memory 432 for storing instructions executable by the processing component 422, such as application programs. The application program stored in the memory 432 may include one or more modules each corresponding to a set of instructions. In addition, the processing component 422 is configured to execute instructions to perform the above-mentioned methods.

The device 400 may also include a power component 426 configured to perform power management of the device 400, a wired or wireless network interface 450 configured to connect the device 400 to a network, and an I/O interface 458. The device 400 can operate according to an operating system stored in the memory 432, such as Windows Server™, Mac OS X™, Unix™, Linux™, FreeBSD™ or the like.

In some embodiments, there is also provided a non-transitory computer-readable storage medium including instructions, such as the memory 432 including instructions, which may be executed by the processing component 422 of the device 400 to complete the foregoing methods. For example, the non-transitory computer-readable storage medium may be a ROM, a RAM, a CD-ROM, a magnetic tape, a floppy disk, an optical data storage device, and the like.

It should be understood that "plurality" or "multiple" mentioned in the disclosure may refer to two or more, and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. It can be further understood that in the disclosure, the singular forms of "a", "said" and "the" are also intended to include plural forms, unless the context clearly indicates other meanings.

It should be understood that although the terms first, second, and the like may be used to describe various information, the information should not be limited to these terms. These terms are only used to distinguish the same type of information from each other, and do not indicate a specific order or degree of importance. In fact, expressions such as first and second can be used interchangeably. For example, without departing from the scope of the disclosure, the first information may also be referred to as second information, and similarly, the second information may also be referred to as first information.

It can be further understood that, unless otherwise specified, "connected" includes a direct connection between two without other components, and also includes an indirect connection between two with other elements.

It is further understandable that although the operations in embodiments of the disclosure are described in a specific order in the drawings, they should not be understood as requiring these operations to be performed in the specific order shown or in a serial order, or requiring to perform all the operations shown to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for cell reselection, performed by a terminal, comprising:
  obtaining a reference distance threshold of a cell;
  determining location information of the terminal and obtaining cell reference location information provided by a network device;

determining a distance between the terminal and the cell based on the location information of the terminal and the cell reference location information; and performing cell reselection based on the reference distance threshold and the distance;

wherein the cell comprises a serving cell of the terminal and the method further comprises:

in response to a cell selection receive level value being greater than a cell selection receive level threshold for intra-frequency measurements, a cell selection quality value being greater than a cell selection quality threshold for intra-frequency measurements, and the reference distance threshold of the serving cell being greater than the distance between the terminal and the serving cell, not measuring intra-frequency neighboring cells.

2. The method of claim 1, wherein a target cell obtained by performing the cell reselection based on the reference distance threshold and the distance satisfies: a cell selection receive level value of the target cell being greater than 0, a cell selection quality value of the target cell being greater than 0, and the reference distance threshold of the target cell being greater than the distance between the terminal and the target cell.

3. The method of claim 1, wherein performing the cell reselection based on the reference distance threshold and the distance comprises:

determining R values of a plurality of cells based on R-criteria for cell reselection, wherein the plurality of cells comprise neighboring cells and a serving cell;

in response to there being neighboring cells with the R values higher than the R value of the serving cell and satisfying S-criteria for cell reselection, selecting a neighboring cell with the reference distance threshold greater than or equal to the distance from the neighboring cells with the R values higher than the R value of the serving cell;

in response to neighboring cells with the reference distance thresholds greater than or equal to the distances existing in the neighboring cells with the R values higher than the R value of the serving cell, selecting a neighboring cell with a largest R value among the neighboring cells with the reference distance thresholds greater than or equal to the distances as a reselected cell; and in response to no neighboring cell with the reference distance threshold greater than or equal to the distance existing in the neighboring cells with the R values higher than the R value of the serving cell, performing the cell reselection based on the reference distance threshold of the serving cell and the distance between the terminal and the serving cell.

4. The method of claim 1, wherein performing the cell reselection based on the reference distance threshold of the serving cell and the distance between the terminal and the serving cell comprises:

in response to the reference distance threshold of the serving cell being greater than or equal to the distance between the terminal and the serving cell, residing in the serving cell; and in response to the reference distance threshold of the serving cell being less than the distance between the terminal and the serving cell, selecting a neighboring cell with a largest R value among the neighboring cells with the R values higher than the R value of the serving cell as the reselected cell.

5. The method of claim 1, wherein performing the cell reselection based on the reference distance threshold and the distance comprises:

selecting cells that satisfy conditions of cell selection receive level values being greater than 0, cell selection quality values being greater than 0, and reference distance thresholds being greater than distances;

determining R values of a plurality of cells in the selected cells based on R-criteria for cell reselection; and in response to there being neighboring cells with the determined R values higher than the R value of the serving cell, selecting a neighboring cell with a largest R value among the neighboring cells with the determined R values higher than the R value of the serving cell as a reselected cell.

6. The method of claim 1, wherein obtaining the reference distance threshold of the cell comprises:

obtaining the reference distance threshold of the cell based on a broadcasted system message of at least one of a serving cell or a neighboring cell.

7. A non-transitory computer-readable storage medium having stored therein instructions that, when executed by a processor of a mobile terminal, cause the mobile terminal to perform the method of claim 1.

8. A method for cell reselection, performed by a network device, comprising:

sending a reference distance threshold of a cell, wherein the reference distance threshold is configured for a terminal to perform cell reselection based on the reference distance threshold and an actual a distance between the terminal and a center of the cell;

sending cell reference location information, wherein the cell reference location information is configured for the terminal to determine the distance between the terminal and the cell based on location information of the terminal and the cell reference location information;

wherein the cell comprises a serving cell of the terminal, in response to a cell selection receive level value being greater than a cell selection receive level threshold for intra-frequency measurements, a cell selection quality value being greater than a reference signal received quality threshold for intra-frequency measurements, and the reference distance threshold of the serving cell being greater than the distance between the terminal and the serving cell, the terminal does not measure intra-frequency neighboring cells.

9. The method of claim 8, wherein a target cell obtained by performing the cell reselection by the terminal based on the reference distance threshold and the distance satisfies: a cell selection receive level value of the target cell being greater than 0, a cell selection quality value of the target cell being greater than 0, and the reference distance threshold of the target cell being greater than the distance between the terminal and the target cell.

10. A network device, comprising:

a processor; and a memory for storing instructions executable by the processor, wherein the processor is configured to perform the method of claim 8.

11. A non-transitory computer-readable storage medium having stored therein instructions that, when executed by a processor of a network device, cause the network device to perform the method of claim 8.

12. A terminal, comprising:

a processor; and a memory for storing instructions executable by the processor, wherein the processor is configured to:

obtain a reference distance threshold of a cell;

determine location information of the terminal and obtain cell reference location information provided by a network device;

determine a distance between the terminal and the cell based on the location information of the terminal and the cell reference location information; and perform cell reselection based on the reference distance threshold and the distance;

wherein the cell comprises a serving cell of the terminal and the processor is further configured to:

in response to a cell selection receive level value being greater than a cell selection receive level threshold for intra-frequency measurements, a cell selection quality value being greater than a cell selection quality threshold for intra-frequency measurements, and the reference distance threshold of the serving cell being greater than the distance between the terminal and the serving cell, not measure intra-frequency neighboring cells.

13. The terminal of claim 12, wherein in performing the cell reselection based on the reference distance threshold and the distance, the processor is further configured to:

determine R values of a plurality of cells based on R-criteria for cell reselection, wherein the plurality of cells comprise neighboring cells and a serving cell;

in response to there being neighboring cells with the R values higher than the R value of the serving cell and satisfying S-criteria for cell reselection, select a neighboring cell with the reference distance threshold greater than or equal to the distance from the neighboring cells with the R values higher than the R value of the serving cell;

in response to neighboring cells with the reference distance thresholds greater than or equal to the distances existing in the neighboring cells with the R values higher than the R value of the serving cell, select a neighboring cell with a largest R value among the neighboring cells with the reference distance thresholds greater than or equal to the distances as a reselected cell; and in response to no neighboring cell with the reference distance threshold greater than or equal to the distance existing in the neighboring cells with the R values higher than the R value of the serving cell, perform the cell reselection based on the reference distance threshold of the serving cell and the distance between the terminal and the serving cell.

14. The terminal of claim 12, wherein in performing the cell reselection based on the reference distance threshold and the distance, the processor is further configured to:

select cells that satisfy conditions of cell selection receive level values being greater than 0, cell selection quality values being greater than 0, and reference distance thresholds being greater than distances;

determine R values of a plurality of cells in the selected cells based on R-criteria for cell reselection; and in response to there being neighboring cells with the determined R values higher than the R value of the serving cell, select a neighboring cell with a largest R value among the neighboring cells with the determined R values higher than the R value of the serving cell as a reselected cell.

* * * * *